United States Patent

[11] 3,588,855

[72] Inventor Richard F. Scully Longmont, Colo.
[21] Appl. No. 767,196
[22] Filed Oct. 14, 1968
[45] Patented June 28, 1971
[73] Assignee International Business Machines Corporation Armonk, N.Y.

[54] DATA GAP RESPONDING APPARATUS
9 Claims, 5 Drawing Figs.

[52] U.S. Cl. .......... 340/174.1, 179/100.2
[51] Int. Cl. .......... G11b 27/22, G11b 5/02
[50] Field of Search .......... 340/174.1 (B); 179/100.2 (S), 100.2 (B), 100.2 (K)

[56] References Cited

UNITED STATES PATENTS

| | | | |
|---|---|---|---|
| 2,975,407 | 3/1961 | O'Brien | 340/174.1 |
| 3,490,013 | 1/1970 | Lawrance et al. | 340/174.1 |
| 3,463,877 | 8/1969 | Crum | 179/100.2X |
| 3,485,961 | 12/1969 | Lovick et al. | 179/100.2 |

*Primary Examiner*—Bernard Konick
*Assistant Examiner*—Gary M. Hoffman
*Attorneys*—Hanifin and Jancin and Earl C. Hancock

ABSTRACT: Gaps in a stream of data from a reading station associated with a recording medium such as a magnetic tape are tested to determined whether or not they represent positive information such as an interblock gap. Detection of a gap during a write check operation causes immediate cessation of the write operation. When interpreting gaps, detection of a gap in the data initiates a timeout operation which is aborted if data reappears before the timeout is completed. The output of the timeout circuitry indicates that further data reading should be effected or that a positive block such as an interblock gap has been encountered.

INVENTOR
RICHARD F. SCULLY
BY Earl C. Hancock
ATTORNEY

DATA GAP RESPONDING APPARATUS

BACKGROUND OF THE INVENTION

1. Field of the Invention

The present invention relates to circuitry for responding to gaps appearing in streams of data from a reading station. In one feature, the invention interprets these gaps for determining whether or not they are positive information such as an interblock gap. The invention also relates to circuitry for responding to a detected gap during a write check operation by deconditioning the writing circuitry. More particularly, the present invention relates to apparatus particularly useful for magnetic tape control units, wherein the gaps appearing in the data on the magnetic tape can be used to immediately stop a writing operation and/or can be interpreted to determine whether or not the gaps are proper interblock gaps, or whether they are gaps caused by extraneous conditions in the data. Although not specifically limited to magnetic tape applications, the present invention is particularly useful for error correcting procedures in writing data on magnetic tape as well as for proper head positioning during reading, spacing or other similar magnetic tape operations.

2. Description of the Prior Art

In recording binary data with magnetic tape units which utilize both a read and a write head, the read head is employed for reading the data that has just been written by the write head during a writing operation. This is known as write checking. The data recorded on the magnetic tape is generally formed in a series of records or blocks with gaps therebetween called interblock gaps or IBG's. The IBG does not contain any significant data but does provide positive information in that it indicates the end of one record and the beginning of the next record. When the write checking circuitry detects an error in the data that has been recorded on the magnetic tape, it is necessary that the device backspace over the record containing the error to the preceding interblock gap, erase the erroneous record and rerecord the data either in the same location or at a spaced location further along the tape.

Several systems have been developed in an effort to provide a recovery when a recording error is detected. For instance, the detection of an error during recording can be followed by a "backhitch" operation wherein the tape is moved backwards for a fixed period of time which is intended to be of sufficient length to ensure passing the prior gap. This system is only practical for recording with fixed length blocks, however. Another system for positioning the erase head in the preceding gap is shown in U.S. Pat. No. 2,975,407, "Erase Forward," by O'Brien, wherein the tape is moved backwards until the preceding gap is detected. Thereafter, a fixed erasure period is provided in the forward direction. The prior art systems continue to attempt to write the record in progress after storing an indication of the existence of an error before entering any error correction mode.

As long as the defect is relatively small, as shown in the O'-Brien patent, or the distance to pass the preceding IBG is known, the prior art systems are satisfactory. However, whenever a magnetic tape contains a defect of a sufficiently large magnitude to effect the appearance of an interblock gap, the prior art systems are not satisfactory. More specifically, if a large defect such as a crease in the tape is encountered within the record, and if this crease is large enough to cause the appearance of a gap in the data, the prior systems upon initiating error recovery would return to this false gap from the end of the record and erase from that position forward. Unfortunately, the initial part of the record which was first recorded would remain on the magnetic tape and not be erased, thereby creating an apparently permanent error condition for reading operations at a later time. When the defect is large enough to approach or exceed an IBG in width, the problem is even more aggravated.

In summary, defects large enough to cause the appearance of gaps in data will cause prior art systems to falsely indicate detection of an interblock gap during backspacing, reading or spacing operations and can result in a failure to position the read/write heads in the true interblock gap. The problem is particularly critical when correcting an erroneous record during a write operation. This results in partial duplicate blocks on tape while writing and mispositioning during spacing and reading operations.

SUMMARY OF THE INVENTION

The present invention permits the proper positioning of read/write heads relative to interblock gaps despite the presence of false gaps in the records. In one aspect, the present invention is concerned with circuitry for degating a write operation immediately upon detecting a gap in data during a write check operation thereby preventing the inclusion of gaps approaching an IBG in length. In another aspect, the invention contemplates circuitry for backspacing over a record which contains false gaps without misinterpreting these gaps as IBG's. By combining the two aforementioned aspects, the present invention provides a means for accurately recovering from large gap error conditions during write operations. Further, the present invention makes it possible to avoid detecting a small error during a reading or spacing operation which might result in dropping sufficient tracks and/or zones to indicate that an interblock gap has been reached so that the head will be positioned in the proper reading position.

In the present invention, the recognition of a gap at a read head while write checking data being recorded is effective to prevent further efforts to record. This can be done by degating the write heads, energizing a trailing erase head or, under some conditions, switching the read head to act as an erase head. This could then be followed by IBG location through prior art arrangements such as are shown in the O'Brien patent or by combination with the IBG interpreting aspect of this invention. For the IBG interpreting aspect of this invention, the detection of the fact that an apparent gap has been reached initiates a timeout operation which is of sufficient length to ensure that the gap at least approaches an interblock gap in length before it is interpreted as an IBG. That is, if the timeout is completed without detection of further data, a signal is indicated that a true interblock gap has been reached. Conversely, if additional data is encountered before the timeout is completed, the timeout is aborted and the continuation of data reading is effected. Thus the gap interpreting aspect of this invention permits ignoring of false gaps and the proper positioning of the read head in an interblock gap.

When a writing operation is being performed and an error is encountered, the present invention contemplates utilizing a write inhibit function which will immediately remove current from the write head. This would prevent any gap from appearing subsequently in the data which could be misinterpreted as an interblock gap and would leave, at the most, a very short gap. This short gap would be ignored by the gap interpreting feature of this invention since the timeout function mentioned hereinbefore would not be completed before the short gap was passed. Thus, when a timeout is able to be completed, it can be anticipated that the read/write heads are, in fact, in the interblock gap.

An object of this invention is to provide a means for interpreting the gap encountered during a stream of data read from a recording medium.

Another object of this invention is to determine whether or not a gap encountered in a stream of data from a recording medium is an interblock gap.

Yet another object of the present invention is to provide a means for preventing the appearance of false interblock gaps from occurring in data as it is being written and to ensure that the heads are repositioned in the true interblock gap before erasure is effected.

Still a further object of the present invention is to provide apparatus for ensuring that a magnetic tape recording operation will be properly effected for correctly recording blocks of data despite significant defects in the tape.

Still another object of the present invention is to respond to an error condition while writing data so as to prevent further recording of data on the recording medium.

The foregoing and other objects, features and advantages of the present invention will be apparent from the following more particular description of the preferred embodiment of the invention as is illustrated in the accompanying drawings.

DESCRIPTION OF THE PREFERRED EMBODIMENT

Figure 1:
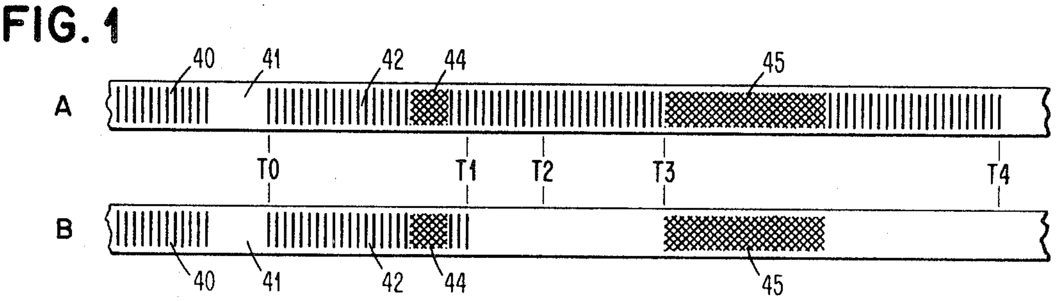
FIG. 1 shows comparative hypothetical sections of tape with symbolic representations of portions of recorded data and defective areas thereon.

The embodiments illustrated in the drawings will be described with particular emphasis upon their use in write error recovery arrangements for magnetic tape recording devices. However, it will be appreciated that the invention is not limited to these specific applications and can, in fact, be employed for other tape device operations as will be briefly discussed later in this description. In addition, the present invention is applicable for use in other environments such as disc files, strip files and various other applications which will be apparent to those having normal skill in the art.

During a forward write operation on magnetic tape, the read head trails the write head and performs write checking by reading the data just written on the tape by the write head. If a failure to properly record is detected, it is assumed that it has resulted from a defect in the tape. Prior art systems continued to attempt to record the data on the tape and then backspaced until the preceding interblock gap (IBG) is detected as has been discussed hereinbefore. The existing systems would then move the tape forward and erase for a preset period of time, typically erasing a 3 to 5 inch gap. The prior art systems would then attempt to record the block of data at the new location on tape.

Occasionally, the tape has a significant defect, such as a crease large enough to cause several tracks of data to be lost, which occurs within the boundaries of a block of data so that parts of that block of data appear on both sides of the defect. The prior art machines would backspace until they reached the defect which would then be misinterpreted as the preceding IBG. Forward erasing for a fixed period of time would commence at that point, but the portion of the record written before the defect would not be erased.

Figure 2:
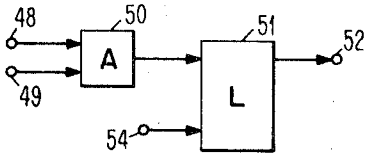
FIG. 2 illustrates a highly simplified embodiment of logic circuitry for the write degating feature of the present invention.

FIG. 1 shows a comparison of hypothetical segments of a magnetic tape with tape A representing the prior art recording and tape B representing recording with this invention. Each tape includes a preceding record as is indicated generally in the area 40 which is followed by IBG 41. In FIG. 1, it is assumed that the read and write heads are stationary and that the tape is moving past these heads from right to left so that record 40 is recorded before record 42. Record 42 would normally encompass the space between T0 and T4. From time T0 until defect 44 is reached, normal recording of record 42 will continue. However, defect 44 will cause the read heads to detect the absence of data indicating an error condition and logic circuitry, such as is shown in FIG. 2, will immediately decondition the write heads. Due to the spacing between the read and write heads and circuit delays, the write heads would not actually be deconditioned until T1 for tape B. Even if the drive mechanism is immediately given a stop order at T1, inertia of the drive will cause the tape to continue moving until T2 before reverse movement can be initiated. However, no data would be recorded in the gap between T1 and T2. When T1 is reached in the reverse direction on tape B, the presence of data will be detected and the system will begin sensing for the IBG 41.

The prior art systems would attempt to continue recording record 42 after defect 44 had been sensed, even though the fact that an error has been detected would be stored (note tape A). Thus, the prior systems would continue to attempt to record as is indicated on tape A between T1 and T4. In the prior systems, once T4 had been reached, backspacing in preparation for forward erase and rerecording would commence. However, defect 45 is as large as or larger than IBG 41 and, thus, the prior systems would stop upon detecting the apparent IBG at 45 or, absent 45, at defect 44 and commence the forward erase procedure from there. As a result, the entire portion of record 42 between T0 and T3 would be left on the tape. During a subsequent read operation with present tape systems, this would cause an apparent error condition from which there cannot be any automatic recovery.

To reiterate, the prior systems would write record 42 until passing T4. These systems would then reverse in a backspacing operation and the appearance of data at T4 would condition the prior systems so that the detection of defect 45 would suggest that IBG 41 has been reached when it has not, in fact, been reached. Conversely, the present invention would not condition the circuitry to begin inspecting for an IBG until T1 was reached on a backspace and the timeout would prevent 44 from being interpreted as IBG 41. If the T1 to T2 distance is kept slightly less than an IBG width, then the present invention can be conditioned immediately upon startup of the backspace operation.

As mentioned, it should be kept in mind that the primary utility contemplated for the present invention is for incorporation within the components of existing tape drives and tape control units and will be described in that context. Therefore, only the components necessary to modify existing tape drive/control unit configurations to include the present invention will be shown and described herein. It is only necessary that the drive and control unit provide the circuitry of the present invention with signals indicative of the presence or absence of a gap in the data. In existing machines, this function is provided by magnetic detectors which sense the presence of data on each track along the magnetic tape. The sensors are frequently grouped into zones for the purpose of indicating the presence or absence of interblock gaps. For instance, for a nine-track magnetic tape system, three zones of three tracks each might typically be employed. However, the tracks associated with a particular zone are generally interleaved. For instance, a three-zone, nine-track system might employ the first, fourth and seventh tracks for the first zone, the second, fifth and eighth tracks for the second zone and the third, sixth and ninth tracks for the third zone. Statistically, it has been found that the absence of outputs from the amplitude sensors for one complete zone and at least one track for each of the other two zones is sufficient to indicate that an apparent IBG is present. Conversely, detection of data by any greater number of tracks would indicate the presence of data. If desired, of course, the detection circuitry could require all or any number of tracks to be down before a gap is indicated.

FIG. 2 illustrates in simplified form the manner in which write inhibiting can be effected in conjunction with the present information. As can be seen from FIG. 1, if the read heads, while write checking, encounter defect area 44, a signal is introduced at input terminal 48. Concurrently, the fact that a write check operation is in process would be indicated by a signal being present at terminal 49. As a result, AND 50 will produce an output setting latch 51. The set output of latch 51 at terminal 52 is then used to degate the write busses for the write heads and thus prevent any further attempts to record block 42 on the tape. Thus, the write inhibit output at 52 is effectively the condition which causes writing to cease at T1 in FIG. 1B. As mentioned hereinbefore, signal 48 will appear if all of the tracks of one zone, and at least one track in each other zone, are failing to detect data, if all tracks of a zone fail to detect data or if any track or combination of tracks are failing to detect data. The object of the FIG. 2 circuitry is to limit the gap in the recorded envelope to no greater than the read/write head gap which is considerably less than the IBG. This can be seen quite clearly in FIG. 1B where the distance between defect area 44 and T1 is less than IBG 41. This guarantees backspacing over error gaps in the envelope by the FIG. 3 circuit, and that only a true IBG will produce an output therefrom. Note that, if gap 44 were not present, recording would have continued until T3 before write head degating. Since gap 45 is greater than the read/write head spacing, no gap would be left in the data between T0 and T3 under these conditions, and repositioning for erase operations can then be effected, as is taught by the said O'Brien patent or by other well-known means.

The basic data removing operation described above relative to the FIG. 2 circuits can be accomplished in any number of ways, including or excluding write head deconditioning. For instance, the trailing read head could be switched to operate as an erase head as soon as gap 44 is detected, thereby ensuring that no data is recorded past gap 44. Essentially the same operation could be effected by adding a trailing erase head which would be actuated by sensing of gap 44. These arrangements would make it possible to employ existing circuitry for head positioning relative to IBG 41, such as is shown in the O'-Brien patent. However, a more advantageous arrangement is to combine the write head degating circuit of FIG. 2 with the gap interpreting feature of the present invention as will be described in greater detail for FIGS. 3 and 4. This combination is particularly advantageous in that it minimizes the cost of additional components that might be required.

From the time that the write heads are turned off, several options of procedure are available and are all compatible with the present invention. If the tape drive is under control of a channel, the tape drive motor can be turned off and allowed to stop at T2, as shown in FIG. 1, with the channel simply continuing to attempt to write data on the record without effect. With this option, backspacing is minimized since the reverse direction need only be started at T2 instead of at T4. A second option is to merely inhibit the writing by the signal at 52, but to allow the tape to continue to move as normal until the channel directs the tape drive to stop. This would mean that the read/write heads would move from T2 to T4 before backspacing, but no data would be recorded in the space between T1 and T4. Yet a third option is to degate the write heads, but to continue motion of the tape for a brief period of time through a single shot, timeout or similar control. This would ensure that sufficient tape has passed under the read/write heads beyond the defect area so that tape motion will have settled down during a backspacing operation before data is detected. That is, instead of stopping the tape motion at time T2, this third option would permit the tape to move to T3, for example, before backspacing was commenced. This would have the advantage of ensuring that a defect such as might be caused by a crease in the tape such as 44 occurring close enough to T0 so as to be exaggerated by the reversing motion sufficiently to prevent recognition of any data prior to positioning of the read head in IBG 41.

As soon as the forward motion is completed in accordance with any of the aforementioned options, a reset signal would be introduced to terminal 54 to recondition the write heads for responding to subsequent data inputs.

Figure 3:
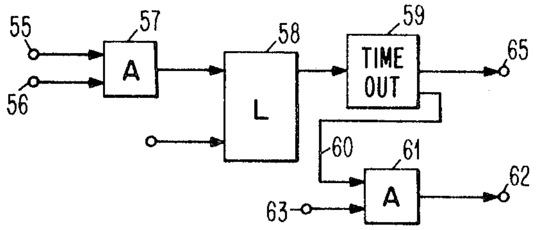
FIG. 3 is a simplified block diagram of a logical arrangement for the gap interpreting feature of the present invention.

The particular circuitry for ensuring that proper positioning relative to the IBG is shown in FIG. 3 and will now be described in conjunction with FIG. 1B. After the forward motion of the tape has been stopped in response to detection of defect area 44, the tape motion will be reversed and this backspacing operation is indicated by a signal at terminal 55. Thereafter the amplitude sensors will detect the presence of data at T1 and cause a signal to be introduced at terminal 56, thus completing the conditioning of AND 57. Latch 58 will then be set and initiate the operation of timeout circuit 59.

While timeout 59 is in operation, line 60 will be raised, thereby partially conditioning AND 61. When the sensors detect the reappearance of data, they will provide an input signal to terminal 63. If the timeout operation of 59 has not been completed at that time, an output signal will be produced at terminal 62. This signal will indicate that a true IBG has not been realized and that tape movement should continue and further testing for the true IBG effected. Conversely, when the operation of timeout 59 is completed, line 60 will drop and a signal will be produced at output terminal 65. This would indicate that the heads are now properly positioned relative to IBG 41.

The operation of timeout 59 can be performed in several different ways. For instance, using the write inhibit of FIG. 2, it can be assumed that the only gap in the data actually recorded would be a single gap of less than an IBG in width, such as 44. This pattern would be substantially as is shown between T0 and T1 in FIG. 1B. Therefore, the timeout 59 can be performed by a simple single-shot or delay circuit with logic reacting to the signals at 62, so as to assume that the next gap in the stream of data that is encountered will be IBG 41. By this configuration, only one timeout attempt would actually be performed by the present invention. However, if it is recognized that several possible defects might be encountered before the true IBG is detected, a resettable timeout circuit can be used for 59. Such a system is shown in FIG. 4 and will now be described in more detail.

Figure 4:
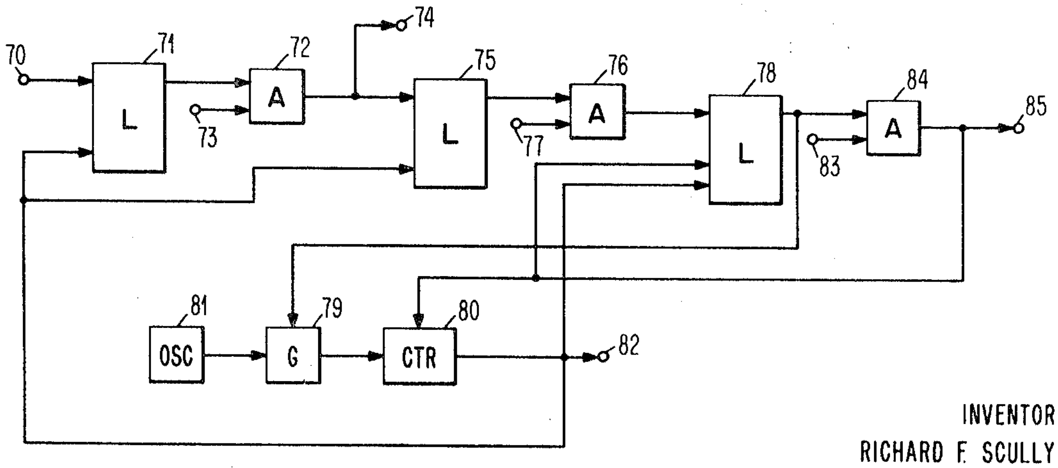
FIG. 4 is a detailed logic diagram showing one arrangement for effecting the operations defined in FIG. 3.

As with FIG. 3, the FIG. 4 circuitry can be selectably brought into operation. As an example, if the FIG. 4 circuitry is being employed in conjunction with write error recovery, it would no be brought into operation until the backspacing was commenced at some point between T1 and T4 in FIG. 1B. It will be assumed that all latches in FIG. 4 have been reset previously. The detection of data at T1 during the backspace operation will be indicated by a signal appearing at input terminal 70 from the amplitude sensors. This will set latch 71 which, in turn, partially conditions AND 72. Input 73 for AND 72 would be a signal indicating that data is not present in the data stream and would be essentially in inverse of the signal as is introduced at terminal 70. The output of AND 72 is coupled to terminal 74 to remove power from the tape drive capstan. The signal at 74 could be delayed to ensure a desired positioning in the IBG when it is reached.

Additionally, the output from 72 will set latch 75 to indicate the presence of a gap in the data which is to be tested for IBG. The set output of latch 75 will partially condition AND 76 with the other input 77 thereof being a signal indicating that an allowable command is being performed by the tape drive and control unit. These allowable commands for input 77 can originate either within the tape drive control unit itself or could be supplied from the controlling channel. These could be backspace, forward space or any single block read or space commands.

The output of AND 76 will set latch 78 to initiate the timeout operation. Thus, when latch 78 is set, gate 79 will be conditioned to allow counter 80 to begin counting output pulses from oscillator 81. A particular count in counter 80 would be preselected and would produce an output at terminal 82, denoting that a true IBG has been encountered. Output 82 would also be coupled back to reset latches 71 and 75 as well as latch 78. This will initialize the FIG. 4 circuitry in order to respond to the next gap interpretation operation.

However, if the amplitude sensors detect the renewed presence of data, they will be coupled to provide an input signal to terminal 83, thereby completing the conditioning of AND 84. The output of AND 84 will provide a signal at terminal 85 which would be interpreted by logic not shown to cause the motor drive to continue moving the tape preparatory for further testing for an IBG. In addition, the signal at 85 would clear counter 80 and reset latch 78. By so doing, further pulses from oscillator 81 cannot be counted in counter 80 until another apparent gap has been detected by a signal appearing at terminal 73. The signal at terminal 82 will reset the control unit and, if appropriate, send a channel disconnect signal which reflects the fact that the read/write heads are now positioned in IBG 41. For a write error recovery procedure, the next channel command would be an "erase gap" command to cause the erase head to clear the tape for a fixed period of time or for a variable period of time, as will be discussed hereinafter for FIG. 5. The erase gap command would be followed by a new writing attempt at a new location on the tape which would be somewhere beyond T4 in FIG. 1.

As discussed earlier, the operation performed by gate 79, counter 80 and oscillator 81 could be replaced with a single-shot circuit, if desired. The single-shot would be initiated by latch 78, but could be prevented from producing an output by a signal at 85 from AND 84. Such a modification could be subject to a failure to respond whenever a gap such as 44 appears very close to a preceding IBG, however.

In the event that a large defect area, such as 45, should start within IBG 41 and extend well into the tape area intended for the next record 42, the write head degating circuitry of FIG. 2 might respond before any data is written for record 42. Under these conditions, the FIGS. 3 and 4 gap interpreting circuitry during backspace would not cause the read/write heads to be properly positioned in IBG 41, but would cause them to position in the IBG preceding record 40, thereby hazarding the loss of record 40 during a forward erase. To prevent this, the output 52 of FIG. 2 can be ANDed with a signal indicating that data has actually been detected at the read head before a write head degating can actually be accomplished. This ANDed output could be slightly delayed to lengthen the amount of recorded data sufficiently to accommodate FIGS. 3 and 4 circuit stabilization, if desired. This would ensure that at least some portion of record 42 would be present for interpretation during backspacing. Note that the "write check on" signal at 49 in FIG. 2 would also be delayed a sufficient length of time to allow the initial type of a record written by the write heads to move from the write head to the read head.

The gap interpreting feature of the present invention can be employed for read commands, forward space commands such as might be used for skipping a record or the like, or in other error recovery procedures which might not necessarily be preceded with an erase. Thus, if a record should contain a series of small defects which are not as large as an IBG, the circuitry of FIG. 4 could be particularly useful for finding the beginning or ending of a record. These applications and modifications will be readily understood by those having normal skill in the art.

Figure 5:
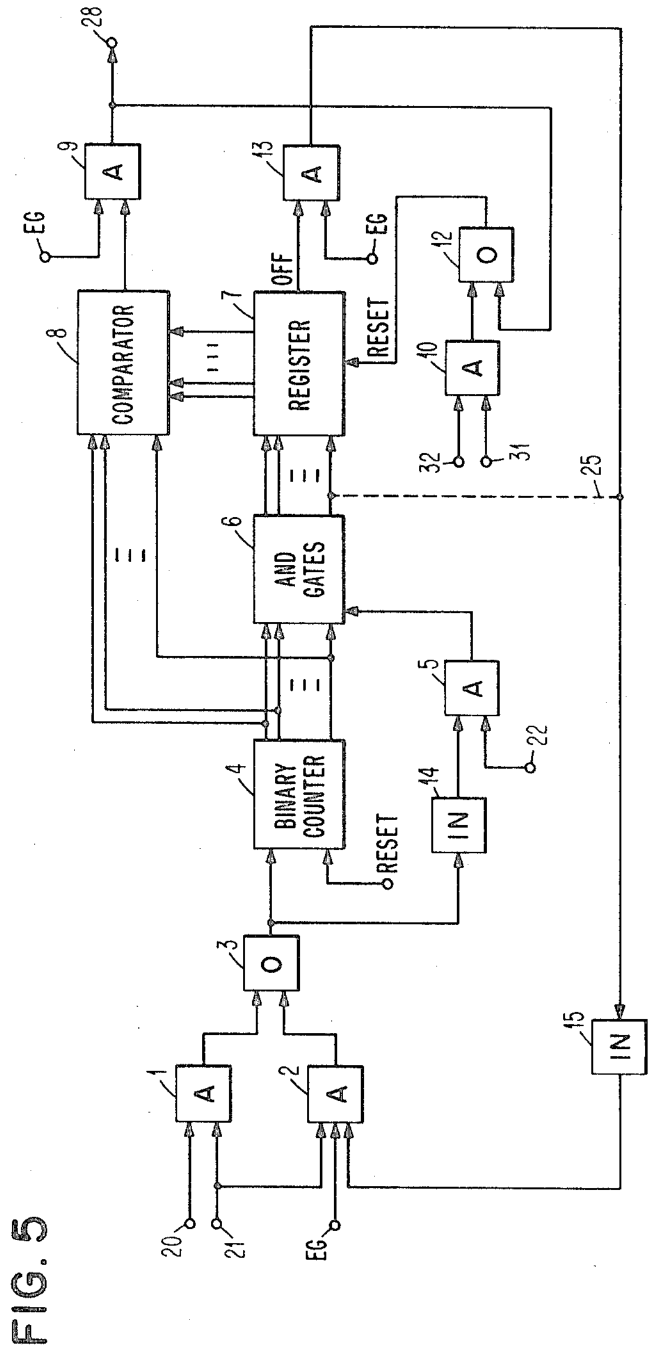
FIG. 5 presents circuitry for providing a variable length erasure particularly useful for write error recovery.

FIG. 5 presents logic circuitry which can permit variable length erasures on write error recoveries. This circuitry stores a count relating to the distance of the defect from the beginning of a record. Prior systems for erasing tape areas containing defects resulted in excessive erasure of usable tape when the defect occurred near the beginning of a fixed length erasure or required wasted time in repetitive erasures and rewrite attempts when the defect originated near the end of a long record.

Defects encountered during recording on magnetic tape can effect a response from the circuitry of FIG. 2 and/or FIG. 3 to position the read/write heads in the preceding IBG. The defects can then be avoided during a rewrite operation by a variable length erase gap system of FIG. 5 which stores a count relating to the distance of the defect from the beginning of a record. Prior systems for erasing tape areas containing defects resulted in excessive erasure of usable tape when the defect occurred near the beginning of a fixed length erasure, or required wasted time in repetitive erasures and rewrite attempts when the defect originated near the end of a long record.

A signal at terminal 20 indicates that a normal write operation is in process, and permits the gating of capstan tachometer pulses appearing at 21 through AND 1 and OR 3 into binary counter 4. In the event that a defect or recording error is encountered, a signal is introduced at 22, partially conditioning AND 5. As soon thereafter as 3 is not producing a count pulse for 4, invert circuit 14 will completely condition 5, thus gating the contents of 4 through AND gates 6 into register 7. By logic not shown, 4 is then reset; the signal removed from 20; and the tape is backspaced to the beginning of the record via FIG. 3 or 4 circuitry preparatory to initiating an erase gap operation. Initiation of the erase gap operation is indicated by a signal at all terminals identified with the reference EG, this signal remaining until the erase gap operation is completed.

AND 13 is partially conditioned by an off indication from 7, but will be deconditioned when a count has been stored in 7. The absence of an output from 13 will cause invert circuit 15 to complete the condition of AND 2, thus again gating tachometer pulses at 21 into counter 4 to reflect movement of the tape during the erase operation. When the contents of 4 and 7 are found to be equal by comparator 8, a signal will complete the conditioning of AND 9; thus effecting a signal at terminal 28, indicating that the erase gap operation should be terminated, and also clearing 7 via OR 12 and resting 4 by means not shown.

A signal will be present at terminal 31 during a write operation, as long as no error is detected. Upon completion of the write operation, a signal is introduced at 32 to cause AND 10 to produce an output, assuring a reset condition for 7.

If a fixed erase gap length is desired, AND 13 can be arranged to introduce a fixed count into 7 through dashed connection 25 whenever an erase gap operation is indicated by an EG signal. The fixed length count from 13 could be preset or could be selectable, as desired. In addition, the output from 13 could also be arranged to increment the count stored in 7 by a fixed or selectable amount to secure erasing for a given distance on the tape. This could be useful for generating an erased gap, even though there by be no defect. Further, incremental counts can be added to 7 via 13 to ensure erasing beyond the defect, is desired. Although the system has been described in terms of counting tachometer pulses, which is particularly useful for single capstan tape drives, any pulse source can be utilized wherein the pulses occur with spacings that correlate to tape movement. For instance, write clock pulses could be adapted for this purpose.

The FIG. 5 circuit could be modified to control positioning of the heads in the IBG, if desired. This would require additional circuitry for keeping track of how far the tape passed the defect before stopping as well as count backward circuitry for determining when backspacing to the IBG is completed. The original count would also have to be stored for the duration of the backspacing operation. However, by using the present invention, none of this additional circuitry would be needed, but the gap interpreting apparatus would be available for ignoring defects during reading, spacing or other normal tape operations.

While the invention has been particularly described and shown relative to the foregoing embodiments, it will be understood by those having normal skill in the art that various other changes and modifications may be made without departing from the spirit of this invention.

I claim:

1. Apparatus for differentiating between gaps in a stream of data available from a medium at a reading station resulting from errors or defects and gaps representing positive information such as interblock gaps comprising:

detector means coupled to said reading station for providing a first output when data is present in the stream and for providing a second output indicating the absence of data in the stream;

timeout means responsive to said second output of said detector means for providing a first output of a duration proportioned to the length of an anticipated interblock gap and for providing a second output thereafter, said second output indicating the presence of an interblock gap in the data stream; and logic means conditioned by said first outputs of said detector means and said timeout means for providing a signal indicative that a gap detected in the data stream is not an interblock gap.

2. Apparatus in accordance with claim 1 wherein said logic means output is coupled to reset said timeout means.

3. Apparatus in accordance with claim 1 wherein said timeout means includes a latch circuit coupled to be set by the second output of said detector means to produce the said first output of said timeout means; and a delayed output producing means initiated into operation in response to the set output of said latch with the delayed output thereof providing the said second output of said timeout means;

said logic means having the output thereof coupled for resetting said latch circuit and for preventing the production of an output by said delayed output producing means.

4. Apparatus in accordance with claim 3 wherein said delayed output producing means is a single-shot circuit.

5. Apparatus in accordance with claim 3, wherein said delayed output producing means includes an oscillator capable of producing a multiplicity of pulses during the duration of said first output of said timeout means, a counter and a gate circuit;

said gate circuit responding to conditioning by the set output of said latch circuit for coupling said oscillator pulses into said counter, said counter being arranged for producing said second output for said timeout means after a preselected number of pulses from said oscillator have been counted, said counter being coupled to be reset by the output of said logic means.

6. Apparatus in a device for recording a stream of data on a medium at a writing station while reading the data at a reading station immediately after it is so written, said stream of data having interruptions of intended nondata gaps having predetermined characteristics, comprising:

first means coupled to said reading station for analyzing signals supplied thereby for supplying signals indicating whether data signals or nondata gaps have been received;

second means supplying signals indicative of said intended nondata gaps;

third means for comparing said indicating signals and supplying an output when said indicating signals do not correspond; and means responsive to the said output for preventing further recording of data on said medium;

whereby unintended gaps in the data actually recorded on said medium will be avoided or at least minimized.

7. Apparatus in accordance with claim 6 wherein said detecting means is an AND circuit coupled to be conditioned for producing an output in response to a signal indicative that a writing operation is in process and a signal indicative that an unintended gap exists in the written data stream; and wherein said responsive means is a latch circuit coupled to be set by the output of said AND circuit; the set output of said latch being coupled for preventing further writing operations at said writing station.

8. In a device for recording a stream of data in blocks separated by positive gaps on a medium at a write station while reading the data at a reading station immediately after it is written and for recovering from an unintended gap in the data stream by repositioning the medium and the read/write stations relative to each other so that the read/write stations are oriented in proximity to the positive gap preceding the data block containing an unintended gap, apparatus for assisting the repositioning operation comprising:

detector means coupled to said receiving station for providing a first output when data is present in the stream and a second output when a gap is present in the stream;

degating means responsive to the second output of said detector means for immediately preventing further recording of data on the medium;

timeout means operable during the repositioning operation for responding to the second output of said detector means for providing a first output of a duration proportioned to the length of a positive gap and for providing a second output thereafter, said second output indicating the presence of a positive gap in the data stream; and logic means conditioned by said first outputs of said detector means and said timeout means for providing a signal indicative that a gap in the data stream is an unintended gap;

whereby said device will not record any unintended gap in a block of data of a length approaching a positive gap and can respond to the first and second outputs of said timeout means for repositioning the read/write stations relative to a positive gap preceding a block containing an unintended gap while ignoring unintended gaps.

9. In a device for recording a stream of data in blocks separated by positive gaps on a medium at a write station while reading the data at a reading station immediately after it is written, the process for assisting in recovery from an unintended gap in the data stream comprising the steps of:

detecting that an intended gap is present in a block of data being written;

preventing further recording of data on the medium upon detection of an unintended gap so as to prevent inclusion in the associated block of a gap of a length approaching a positive gap;

backspacing the medium and stations relative to each other;

detecting the presence of gaps during said backspacing; and determining whether the length of time required for a gap detected during said backspacing to pass is indicative of a positive gap;

whereby the read/write stations will be positioned properly for further corrective action whenever a positive result is produced by said determining step.

930-4008-000
PO-1050
(5/69)

UNITED STATES PATENT OFFICE
CERTIFICATE OF CORRECTION

Patent No. 3,588,855 Dated June 28, 1971

Inventor(s) Richard F. Scully

It is certified that error appears in the above-identified patent and that said Letters Patent are hereby corrected as shown below:

Column 10, line 39, "intended" should read --unintended--.

Signed and sealed this 25th day of January 1972.

(SEAL)
Attest:

EDWARD M.FLETCHER,JR.
Attesting Officer

ROBERT GOTTSCHALK
Commissioner of Patents